US008773582B2

(12) United States Patent
Knoedgen (10) Patent No.: US 8,773,582 B2
(45) Date of Patent: Jul. 8, 2014

(54) SYSTEM AND METHOD FOR CONTROLLING A CAMERA SHUTTER

(75) Inventor: Horst Knoedgen, Munich (DE)

(73) Assignee: RPX Corporation, San Francisco, CA (US)

( * ) Notice: Subject to any disclaimer, the term of this patent is extended or adjusted under 35 U.S.C. 154(b) by 404 days.

(21) Appl. No.: 12/658,508

(22) Filed: Feb. 5, 2010

(65) Prior Publication Data

US 2011/0176053 A1    Jul. 21, 2011

(30) Foreign Application Priority Data

Jan. 19, 2010    (EP) ..................................... 10368002

(51) Int. Cl.
*H04N 5/225* (2006.01)
*H04N 5/238* (2006.01)
*G03B 9/58* (2006.01)
*G03B 9/10* (2006.01)

(52) U.S. Cl.
CPC ... *G03B 9/10* (2013.01); *G03B 9/58* (2013.01)
USPC .......................................... 348/374; 348/367

(58) Field of Classification Search
USPC ................. 348/207.99, 367, 374, 362, 221.1; 396/235, 452, 495; 310/324–340
See application file for complete search history.

(56) References Cited

U.S. PATENT DOCUMENTS

| | | | |
|---|---|---|---|
| 6,733,192 B2 | 5/2004 | Watanabe | |
| 7,350,990 B2 | 4/2008 | Shin et al. | |
| 7,604,422 B2 * | 10/2009 | Julian et al. | 396/489 |
| 8,063,944 B2 * | 11/2011 | Kido | 348/222.1 |
| 8,128,296 B2 * | 3/2012 | Viglione et al. | 396/463 |
| 2007/0110433 A1 | 5/2007 | Masahiko | |
| 2008/0138059 A1 * | 6/2008 | Julian et al. | 396/489 |
| 2009/0213233 A1 * | 8/2009 | Kido | 348/208.4 |
| 2010/0189431 A1 * | 7/2010 | Viglione et al. | 396/463 |
| 2010/0189432 A1 * | 7/2010 | Viglione et al. | 396/468 |

OTHER PUBLICATIONS

Co-Pending U.S. Appl. No. 12/658,280, filed Feb. 5, 2010, "Camera Shutter and Position Control Thereof," assigned to the same assignee as the present invention.

(Continued)

*Primary Examiner* — Ahmed A Berhan
(74) *Attorney, Agent, or Firm* — Howison & Arnott, LLP (57) ABSTRACT

Systems and methods using the same to achieve a camera having precise timing of a camera shutter, which can be used also for a controllable aperture, are disclosed. The aperture can be controlled continuously and can therefore be used for video cameras. The shutter system is controlled by a feedback loop. The shutter blades are moved by at least one linear motor, a position sensor senses the actual position and speed of the blades. The movement of the blades can be stopped any time to get an aperture desired. For capturing an image in a first step a global reset is opening (activating) every pixel of the image sensor after the shutter is opened. In order to achieve a short active light exposure time (below 1 ms), after the global reset, the mechanical shutter invented closes rapidly after a defined active light exposure time. An active light exposure time is the time span between the image sensor is activated and the mechanical shutter is closed. In order to achieve a precise timing the shutter of the present invention uses electronic control and a feedback loop to control the actual position of the shutter.

30 Claims, 4 Drawing Sheets

(56) References Cited

OTHER PUBLICATIONS

Co-Pending U.S. Appl. No. 12/661,752, filed Mar. 23, 2010, Camera Module Having a Low-Friction Movable Lens, assigned to the same assignee as the present invention.

Co-Pending U.S. Appl. No. 12/661,755, filed Mar. 23, 2010, "Twin-Actuator Configuration for a Camera Module," assigned to the same assignee as the present invention.

Co-Pending U.S. Appl. No. 12/661,756, filed Mar. 23, 2010, "Drop Detection Using Lens Position Sensing of Camera Module," assigned to the same assignee as the present invention.

* cited by examiner

SYSTEM AND METHOD FOR CONTROLLING A CAMERA SHUTTER

RELATED PATENT APPLICATIONS

This application is related to the following US patent applications:
titled "Camera Shutter and position control thereof", Ser. No. 12/658,280, filing date Feb. 5, 2010,
titled "Camera Module having a low-friction movable lens", Ser. No. 12/661,752, filing date Mar. 23, 2010,
titled "Twin-actuator configuration for a camera module", Ser. No. 12,661,755, filing date Mar. 23, 2010, and
titled "Drop Detection Using Lens Position Sensing of Camera Module", Ser. No. 12/661,756, filing date Mar. 23, 2010, and the above applications are herein incorporated by reference in their entirety.

BACKGROUND OF THE INVENTION (1) Field of the Invention

This invention relates generally to digital cameras and relates more specifically to camera shutters driven by a linear motor.

(2) Description of the Prior Art

In photography, a shutter is a device that allows light to pass for a determined period of time, for the purpose of exposing photographic film or a light-sensitive electronic sensor to light to capture a permanent image of a scene.

As light travels through a lens opening (aperture), the shutter opens and closes in a timed fashion to determine how long the image sensor ("film") gets exposed to a scene. The exposure time has a most important impact upon the quality of an image. Conventional film cameras are using usually mechanical shutters while digital cameras are often using digital shutters. It is a challenge for the designers of digital cameras to design a shutter mechanism for digital cameras that can be exactly controlled.

The aperture of an optical system is the opening that determines the cone angle of a bundle of light rays that come to a focus in the image plane. The aperture determines how collimated the admitted rays are, which is of great importance for the appearance at the image plane. A narrow aperture will result in sharpness at the image plane, while a wide aperture will result in sharpness for light rays with the right focal length only. This means that a wide aperture results in an image that is sharp around what the lens is focusing on and blurred otherwise. The aperture also determines how many of the incoming rays are actually admitted and thus how much light that reaches the image plane, i.e. the narrower the aperture, the darker the image.

In addition, with the advancement of small portable terminals equipped with cameras having zoom functions and shutters there is a requirement of compact size shutters. Therefore there is a need of precise, compact size shutters, which are easily to be assembled.

Solutions dealing with camera shutters are described in the following patents or patent publications:

(U.S. Pat. No. 6,733,192 to Watanabe) teaches an electromagnetic actuator having a rotor magnetized to have a plurality of poles; a base rotatably supporting the rotor; a yoke having a plurality of magnetic pole portions that are formed so as to face an outer peripheral surface of the rotor and that generate different magnetic poles; a magnetizing coil; and a bobbin/presser member which is disposed on an outer periphery of the yoke, around which the coil is wound, and with which a pressing portion for pressing the yoke against the base and for supporting the rotor is formed integrally. A camera blade driving device according to the present invention has a base having an exposure opening; a shutter blade or a diaphragm blade that is rotatably supported by the base; and an electromagnetic actuator including a rotor that is magnetized to have a plurality of poles and that is rotatably supported by the base, a yoke having a plurality of magnetic pole portions that are formed so as to face an outer peripheral surface of the rotor and that generate different magnetic poles, a magnetizing coil, and a bobbin/presser member which is disposed on an outer periphery of the yoke, around which the coil is wound, and with which a pressing portion for pressing the yoke against the base and for supporting the rotor is formed integrally, the electromagnetic actuator driving the shutter blade or the diaphragm blade. Accordingly, the parts count is reduced, and the assembly task is simplified, while cost is lowered.

(U.S. Pat. No. 7,350,990 to Shin et al.) discloses a shutter device for use with a camera lens assembly, wherein the shutter device includes a shutter base, a shutter blade which is rotatably mounted on the shutter base, a magnet movably coupled to the shutter base so as to enable rotation of the shutter blade, and a yoke extending lengthwise while facing the magnet wherein the movement range of the shutter base is limited within a length of the yoke. The zoom-in/zoom-out operation is enabled by moving only the shutter base, thus enabling a compact size fabrication of the camera lens assembly. The shutter blade is easily installed adjacent to a diaphragm, and the operational speed of the shutter blade is controlled by adjusting the structure of an electronic coil.

U.S. Patent Publication (US 2007/0110433 to Masahiko) describes a shutter driving apparatus for a camera module having a shutter driving section constructed to slidingly move shutter blades provided to a camera lens module in both sideward directions to thereby open and close a lens opening. The shutter driving apparatus comprises a lens housing; a pair of shutter blades provided to the lens housing to be slidingly moved in a lengthwise direction of the lens housing to thereby open and close a lens opening of the camera lens module; and a pair of shutter driving sections respectively connected to the shutter blades via rotation links and each being configured for creating a pair of electromagnetically-opposite electromagnet poles and having a permanent magnet positioned between the poles such that a permanent magnet with at least one of the poles and connected to the rotation link is rotated due to a magnetic field created as current is applied to the electromagnet, to slidingly move an associated shutter blade.

SUMMARY OF THE INVENTION

A principal object of the present invention is to achieve methods and systems to achieve a camera having precise timing of a shutter of the camera, which can be used also for a continuously controllable aperture A further object of the present invention is to control the shutter by a feedback loop.

A further object of the present invention is to drive the blades of a shutter by at least one linear motor.

Another object of the present invention is to sense the actual position and speed of the shutter blades by capacitive, inductive or Hall sensors.

Furthermore an object of the present invention is to achieve an aperture, which can be set continuously.

Moreover an object of the present invention is to achieve an aperture, which can be used for video cameras.

Another further object of the present invention is that no flex wires are required inside the case of the shutter.

In accordance with the objects of this invention a method to achieve a precise timing of a shutter of a digital camera, which can be used also for a continuously controllable aperture has been disclosed. The method invented comprises, firstly, the steps of (1) providing an image sensor and a lens barrel of a digital camera, shutter blades moved by at least one linear motor, wherein each linear motor comprises a coil, iron and at least one magnet fastened on a movable device being connected to the shutter blades. The next step teaches (2) setting up a desired aperture opening by moving the shutter blades, wherein the actual position and speed of the shutter blades is measured and controlled by a feedback loop The following steps are (3) applying a global reset to said image sensor, and (4) capturing an image and closing totally the shutter blades, wherein exposure time is the time span between said global reset and the totally closing of the shutter blades.

In accordance with the objects of this invention a camera having a precise timing of its camera shutter, which can be used also for a continuously controllable aperture, has been disclosed. The camera invented comprises, firstly, an image sensor, a movable lens barrel, one or more actuators to move said lens barrel, and a means to guide the movements of the lens barrel. Furthermore the camera invented comprises a shutter case, and one or more shutter blades, wherein each of the shutter blades is rotatably mounted on the shutter case and the shutter blades are moved by at least one linear motor. Moreover the camera invented comprises said at least one linear motor to move said one or more blades, wherein each motor comprises: at least one coil wrapped around a piece of iron, wherein said iron is fastened on said shutter case and at least one magnet, fastened on a device, which is mechanically connected to the shutter blades. Finally the camera comprises an integrated circuit controlling the motor driving the shutter and the actuators moving the lens barrel and at least one position sensor, sensing a position of said shutter blades.

In accordance with the objects of this invention a camera having a precise timing of its camera shutter, which can be used also for a continuously controllable aperture, has been disclosed. The camera invented comprises, firstly, a shutter case, and at least two shutter blades, wherein each of the blades is rotatably mounted on the shutter case and the blades are moved by at least one linear motor. Furthermore the system comprises at least one linear motor to move said blades, wherein each motor comprises at least one coil wrapped around a piece of iron, wherein said iron is fastened on said shutter case, and a magnet, fastened on a shutter blade. Finally the system invented comprises at least one position sensor, sensing a position of said shutter blades.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems for shutters of cameras. The shutters invented are based on regulated feedback loops. The actual position of a shutter, the speed of the shutter and the shutter delay time can be constantly measured and controlled, enabling very fast shutter speed, and delay time. Furthermore the shutter can be used as an aperture even for video cameras because the aperture opening can be controlled continuously.

A global reset function is provided for the image sensor of the camera. The global reset is opening (activating) every pixel of the image sensor after the shutter is opened to a defined aperture opening. In order to achieve a short active light exposure time (below 1 ms), after the global reset, the mechanical shutter invented closes rapidly after a defined light exposure time. An active light exposure time is the time span between the image sensor is activated and the mechanical shutter is closed. In order to achieve a precise timing the shutter of the present invention uses electronic control and a feedback loop to control the actual position of the shutter.

A key advantage of the shutter invented is that it will be moved together with a lens barrel in order to reach a desired position, e.g. a suitable focus position. The shutter invented shutter is fastened on the lens barrel and it doesn't require any flexible cable inside the lens barrel to be moved with the shutter.

Figure 1:
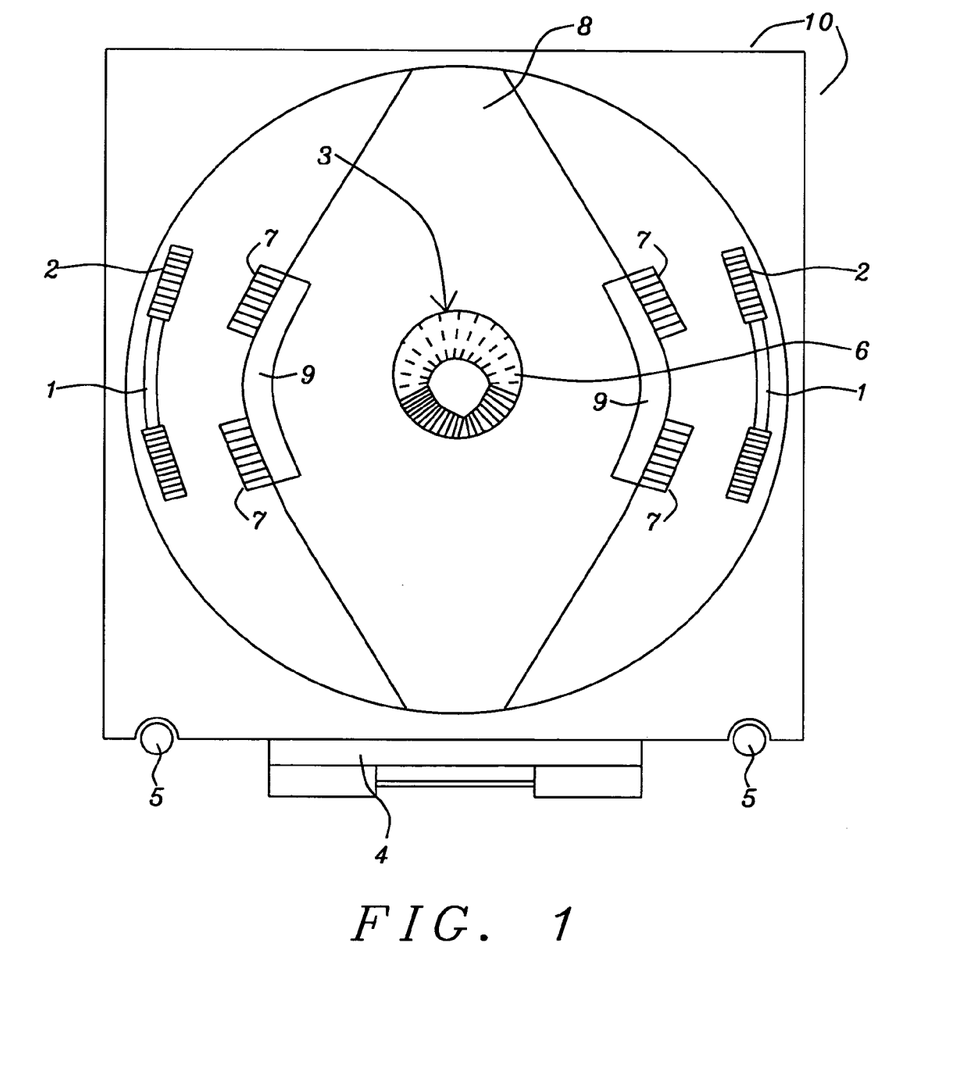
FIG. 1 shows a preferred embodiment of the shutter invented. The shutter is mounted on top of the lens barrel (not visible) or on top of the moving part of the lens system.

FIG. 1 shows a preferred embodiment of the camera shutter invented. The shutter is mounted on top of the lens barrel (not visible) or on top of the moving part of the lens system.

The coils 2 of two bidirectional linear motors driving shutter blades 6 are wrapped around iron coil cores 1. The coils 2 and iron coil cores 1 are mounted on the case of the shutter and inside of a lens barrel of a zoom lens system. Furthermore in a preferred embodiment each linear motor driving shutter blades comprises two magnets 7 fastened on shutter blades 6 or on a movable yoke, which is mechanically connected to the shutter blades 6. The magnets are moved by magnetic force depending upon the currents through the coils 2 and the linear motors are moving the shutter blades 6 directly or via the yoke 8. The opening 3 defines the size of the aperture.

Depending upon the type of linear motor used the permanent magnets 7 could be replaced by a magnetic metal, such as iron. It would also be possible to use one permanent magnet instead of two magnets.

The shutter case can move, together with the blades 6, coils 2 and coil cores 1, up and down along the optical axis of the camera depending upon the movements of the zoom lens barrel. The coils 2 are located on a fixed part of the shutter system. The energy to move the shutter blades comes from the coils. No flexible wires are required to drive the motors.

Any number of blades can be used if they are all mechanically connected by a yoke or any other mechanical connection. In a preferred embodiment two linear motors are used to move the blades. By using two adjacent linear motors the magnetic force to the centre will be minimized. Alternatively using one linear motor is possible as well.

Another linear motor 4 positions the lens barrel to a zooming or focus position. Balls 5 enable the movement of the lens positioning system inclusive of the shutter system. The shutter blades 6 move perpendicular to the optical axis of the camera. The shutter blades 6 themselves are driven by two linear motors having each two coils 2 and a two correspondent pieces of magnetic material fastened on the yoke 8. By supplying a current through the coils the correspondent magnets of the yoke will move together with the yoke 8 and the blades 6 in a direction dependent upon the direction of the current. The blades 6, which are mechanically connected to the yoke 8 are turning around their axis (not shown).

Figure 2A:
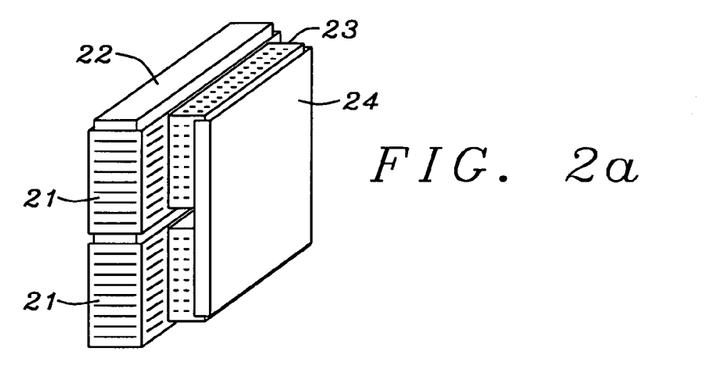
FIG. 2a shows an assembled view of major components of a linear motor used for the present invention.

FIG. 2a shows an assembled view of simplified major components of a linear motor 20, which can be used to control the shutter blades of a camera. The linear motor comprises a coil core 22 around which two coils 21 are wrapped. The coil core 22 is made of magnetic material, as e.g. iron. In order to avoid unnecessary complexity the coil core of FIG. 2a has a straight shape. The shape of the coil core can be adapted to specific requirements. Actually, as shown in FIG. 1, the coil core 1 can be slightly bent to support circular movements of the blades 6 or of a yoke.

Furthermore the linear motor of FIG. 2a has a metallic case 24 containing two permanent magnets 23.

Figure 2B:
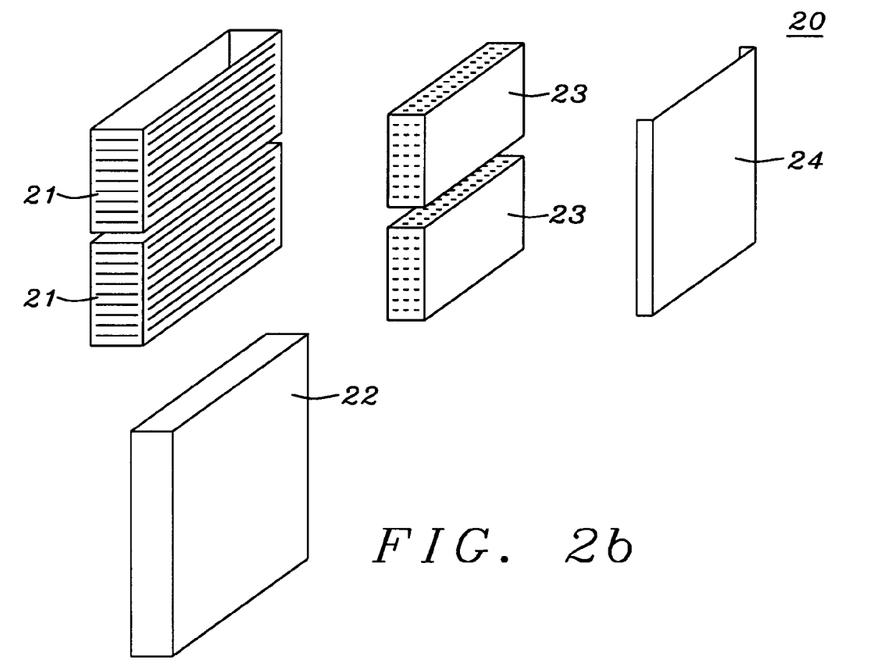
FIG. 2b shows an exploded view of the linear motor used for the present invention.

FIG. 2b shows an exploded view of the linear motor 20. It shows again the coil core 22, two coils 21, two permanent magnets 23, and the metallic case 24.

In one embodiment of the invention, using inductive methods to measure the position of the blades, is the linear motor moving the blades also used to sense the actual position of the blades. If the motor is moving, the metallic case 24 together with the magnets will cover the coils 23 more or less, i.e. the inductance changes with the actual position of the metallic case 24 with the magnets 23, thus enabling to sense the position of the blades. The difference of the inductance of the two coils 23 is correlated to the position of the blades.

The position and the speed of the blades can be measured and controlled by a feedback loop. The position of the blades can be sensed by measuring the difference of inductance as outlined above or by using a capacitive sensor to sense the position of the blades. For a capacitive sensor is that only flat plates are required. Alternatively Hall sensors can also be used.

Figure 3:
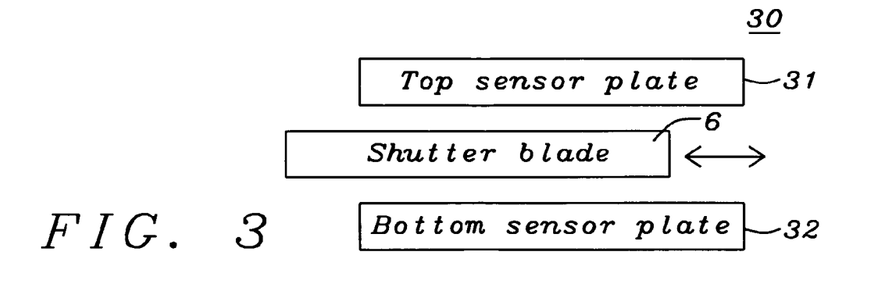
FIG. 3 illustrates a basic arrangement of a capacitive sensor sensing the position of shutter blades.

FIG. 3 illustrates a basic arrangement of a capacitive sensor 30. The sensor comprises a top sensor plate 31 and a bottom sensor plate 32. The capacitance of this arrangement depends upon the actual position of a moving shutter blade 6 and hence the actual position of a blade 6 can be measured by measuring the capacitance between both sensor plates 31 and 32.

There is a correlation between the actual position of the blades and the opening of the aperture formed by the blades. Therefore a desired opening can be established by controlling the movements of the blades. Furthermore it has to be noted that no electrical connection is required to the moving parts of the shutter.

The blades of the shutter are moving continuously when the shutter is closing. This means that, when the movement of the blades is stopped, a stable position of the blades is reached and an aperture of any size can be achieved. The shutter positioning has actually two functions, controlling the position and the speed. This means that the shutter invented can take over the function of an aperture because any size of an aperture allowed by the lens barrel can be implemented before capturing an image. It should be noted that the aperture can be controlled continuously, e.g. for video cameras. This can significantly improve the quality of an image.

Figure 4:
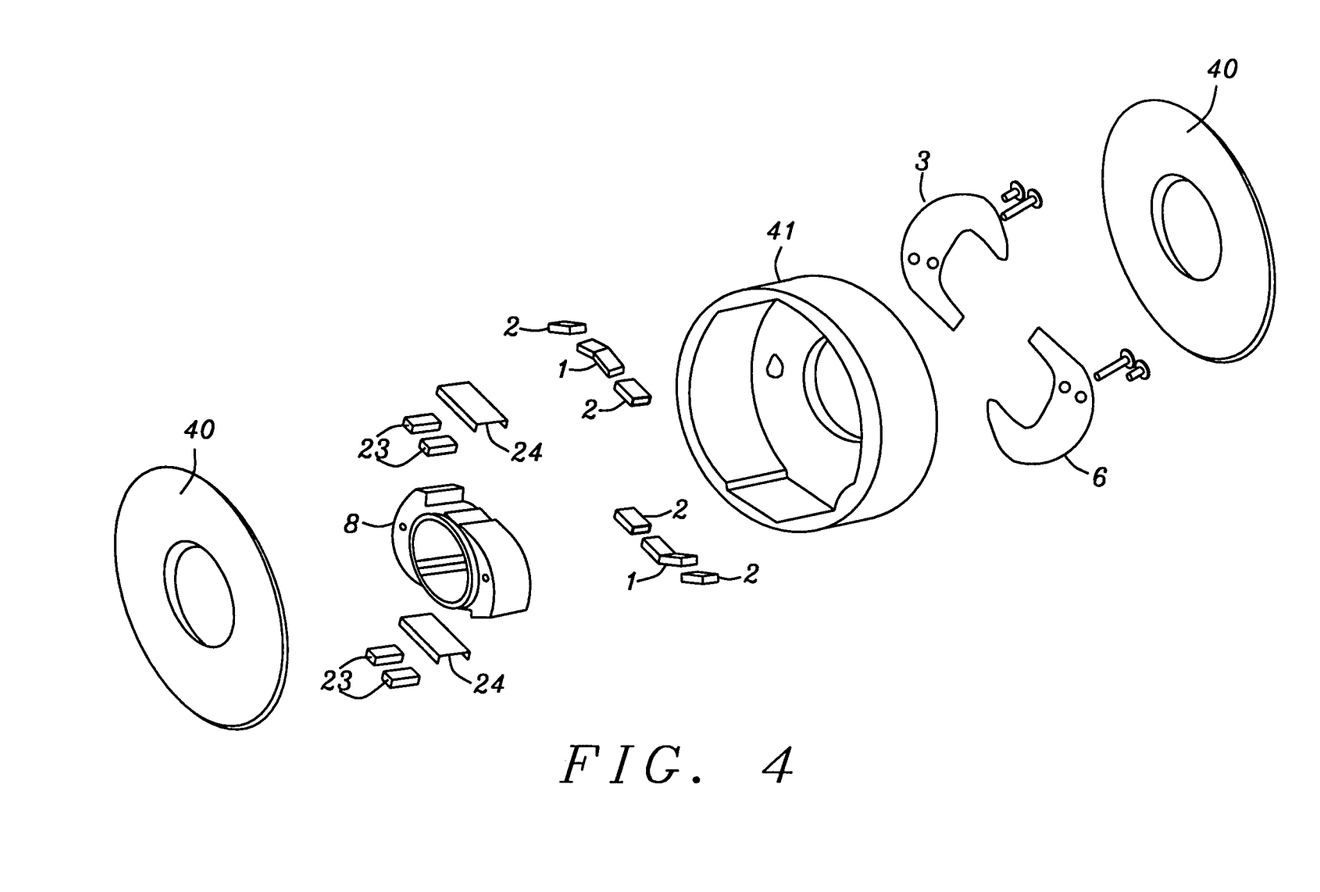
FIG. 4 shows an exploded view of an implementation of the shutter invented.

FIG. 4 shows an exploded view of an implementation of the camera shutter invented. FIG. 4 shows two holder plates 40 at the front and the back end of the shutter. Furthermore FIG. 4 shows two shutter blades 6 having an axis 7 to turn around and a shutter case 41. Alternatively only one shutter blade or more than two shutter blades could be used as well. In case a plurality of shutter blades is deployed the shutter blades can be mechanically connected via a yoke. Two linear motors comprising each an iron 1 and two coils 2 follow in the illustration of FIG. 4. By using linear motors, being mounted adjacently at each side of the shutter case, the magnetic force to the centre will be minimized. Alternatively only one motor could be used as well. Magnetic material 23 and 24 to be fastened on either blades or on a yoke are counterparts of the irons 1 and coils 2. Finally shown is a lens barrel 8, which can be moved along the optical axis.

The camera module invented furthermore comprises an integrated circuit (IC) controlling the actuators of the present invention, an image sensor, and a movable lens barrel in order to support an auto focus function of the camera. This IC also controls actuators with integrated position control to move the lens barrel of the camera module as required as disclosed in the patent application, titled "Camera Module having a low-friction movable lens", Ser. No. 12/661,752, filing date Mar. 23, 2010, and in the patent application, titled "Twin-actuator configuration for a camera module", Ser. No. 12/661,755, filing date Mar. 23, 2010.

Figure 5:
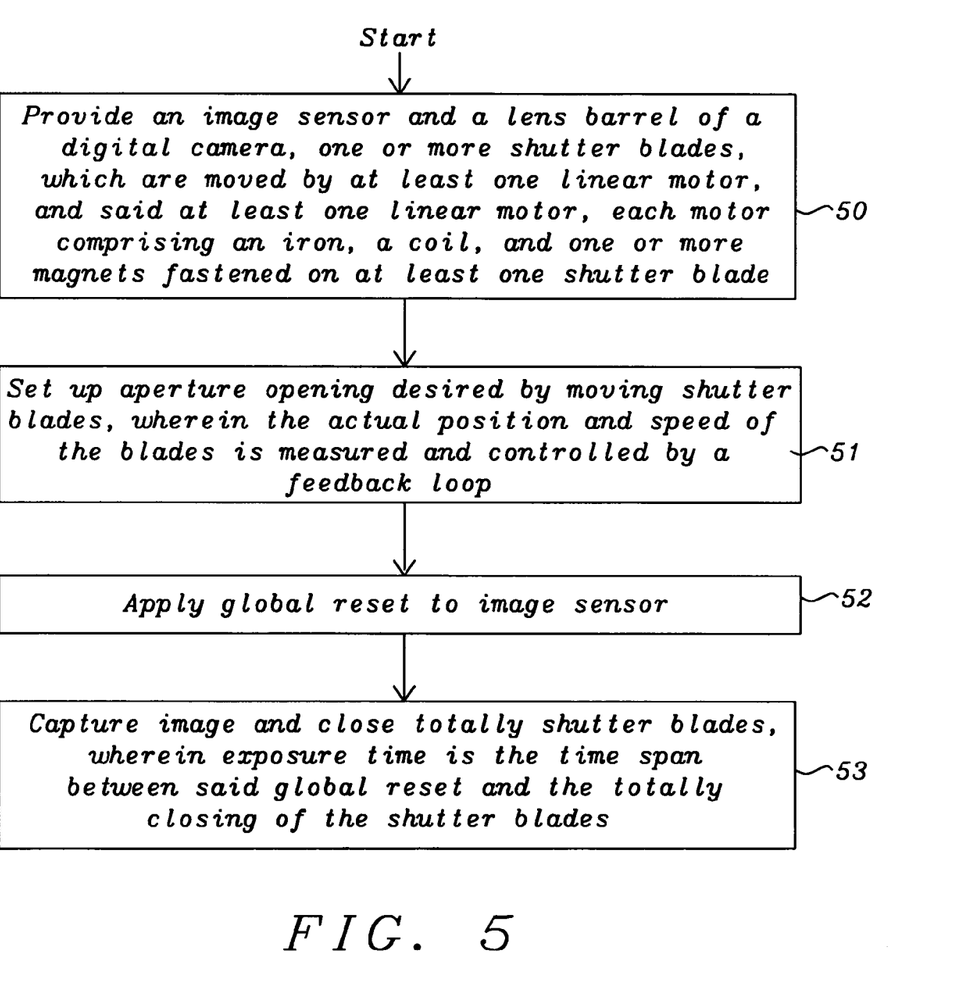
FIG. 5 illustrates a flowchart of a method invented to achieve a precise timing of a camera shutter, which can be used also for a controllable aperture.

FIG. 5 illustrates a flowchart of a method invented to achieve a precise timing of a shutter of a digital camera, which can also be used as for a controllable aperture. The first step 50 illustrates providing an image sensor and a lens barrel of a digital camera, one or more shutter blades, which are moved by at least one linear motor, and said at least one linear motor, each motor comprising an iron, two coils, and at least one magnet fastened on a movable device, which is mechanically connected to the shutter blades. The next step 51 comprises setting up a desired aperture opening by moving shutter blades, wherein the actual position and speed of the blades is measured and controlled by a feedback loop, In order to prevent a hard stop of the blades the speed of the blades can be reduced when they approach a final position, e.g. an aperture opening desired.

The next step 52 illustrates a global reset to the image sensor. The last step 53 describes the capturing of an image and the totally closing of the shutter blades, wherein an exposure time is the time span between said global reset and the totally closing of the shutter blades.

An integrated circuit (IC) controls one or more motors to drive the shutter. This IC can also control one or more motors/actuators to move a lens barrel if an auto focus function is provided with the camera module.

It should be noted that the shutter system invented is able to trigger the imager. By knowing the position of the shutter blades, the shutter arrives at an aperture position desired by the position sensing disclosed above. Even during movements of the shutter blades the image sensor can be triggered by the shutter control. The benefit is, there is no electronic or mechanical delay for the acceleration.

The shutter is able to change continuously the aperture's opening. This function is important for video and still cameras. It is possible to have a fixed exposure time and by changing the aperture's opening the brightness can be adjusted as desired.

While the invention has been particularly shown and described with reference to the preferred embodiments thereof, it will be understood by those skilled in the art that various changes in form and details may be made without departing from the spirit and scope of the invention.

What is claimed is:

1. A method to achieve a precise timing of a shutter of a digital camera, which can be used also for a continuously controllable aperture comprising the following steps:

(1) providing an image sensor and a lens barrel of a digital camera, one or more diaphragm shutter blades moved by at least one linear motor, wherein each linear motor comprises an iron core, a first coil wrapped around the iron core, a second coil wrapped around the iron core, and at least one magnet fastened on a device being connected to the one or more diaphragm shutter blades;

(2) setting up a continuously variable desired aperture opening by moving the shutter blades, wherein the actual position and speed of the one or more shutter blades is measured and controlled by a feedback loop;

(3) applying a global reset to said image sensor; and (4) capturing an image and closing totally the one or more diaphragm shutter blades, wherein exposure time is a time span between said global reset and the totally closing of the shutter blades, wherein the actual position and speed of the one or more diaphragm shutter blades is measured and controlled by said feedback loop.

2. The method of claim 1 wherein the at least one linear motor further comprises two bidirectional linear motors for moving the shutter blades.

3. The method of claim 1 wherein the iron core of each of said at least one linear motor is fastened on a case of the camera shutter.

4. The method of claim 1 wherein sensors are measuring an actual position of said one or more diaphragm shutter blades.

5. The method of claim 4 wherein said sensors are capacitive sensors.

6. The method of claim 4 wherein said sensors are inductive sensors.

7. The method of claim 4 wherein said sensors are Hall sensors.

8. The method of claim 4 wherein sensors are measuring the speed of the shutter blades.

9. The method of claim 1 wherein a position of said one or more diaphragm shutter blades is controlled by the feedback loop.

10. The method of claim 1 wherein said magnets are fastened on a movable yoke, which is mechanically connected to the shutter blades.

11. The method of claim 1 wherein the one or more diaphragm shutter blades further comprise two diaphragm shutter blades.

12. The method of claim 1 wherein the aperture is controlled continuously.

13. The method of claim 1 wherein the one or more diaphragm shutter blades are used for a video camera, wherein the aperture is controlled continuously.

14. A camera having a precise timing of a camera shutter which can be used also for a continuously controllable aperture comprises:
an image sensor;
a movable lens barrel;
one or more actuators to move said lens barrel;
supports to guide the movements of the lens barrel;
a shutter case;
one or more diaphragm shutter blades, wherein each of the one or more diaphragm shutter blades is rotatably mounted on the shutter case and the one or more diaphragm shutter blades are moved by at least one linear motor, wherein the camera shutter combines a high speed shutter function and a continuously variable aperture;
said at least one linear motor to move said one or more diaphragm shutter blades, wherein the at least one linear motor comprises:
a first coil and a second coil wrapped around an iron core, wherein said iron core is fastened on said shutter case; and
at least one magnet, fastened on a device, which is mechanically connected to the one or more diaphragm shutter blades;
an integrated circuit controlling the motor driving the one or more diaphragm shutter blades and the actuators moving the lens barrel; and
at least one position sensor for directly, sensing a position of said one or more diaphragm shutter blades.

15. The camera module of claim 14 wherein said supports of the lens barrel are ball bearings.

16. A camera having a precise timing of its camera shutter which can be used also for a continuously controllable aperture comprises:
a shutter case;
one or more diaphragm shutter blades, wherein each of the one or more diaphragm shutter blades is rotatably mounted on the shutter case and the one or more diaphragm shutter blades are moved by at least one linear motor, wherein the camera shutter combines a high speed shutter function and a continuously variable aperture;
said at least one linear motor to move said one or more diaphragm shutter blades, wherein each motor comprises:
a first coil and a second coil wrapped around an iron core, wherein said iron core is fastened on said shutter case; and
at least one magnet, fastened on a device, which is mechanically connected to the shutter blades; and
at least one position sensor for directly, sensing a position of said one or more diaphragm shutter blades.

17. The camera of claim 16 wherein the one or more diaphragm shutter blades further comprises two diaphragm shutter blades.

18. The camera of claim 16 wherein said sensors are capacitive sensors.

19. The camera of claim 16 wherein said sensors are magnetic sensors.

20. The camera of claim 16 wherein said sensors are Hall sensors.

21. The camera of claim 16 wherein each linear motor has two coils.

22. The camera of claim 16 wherein each linear motor has two magnets.

23. The camera of claim 22 wherein said two magnets are contained in a metallic case.

24. The camera of claim 23 wherein said shutter case can be moved by shutter case linear motor.

25. The camera of claim 16 wherein said shutter case is supported for movement by ball bearings.

26. The camera of claim 16 wherein said movements of said one or more diaphragm shutter blades can be stopped any time in order to achieve an aperture of a desired size.

27. The camera of claim 16 wherein said shutter case is a movable shutter case adapted for slideable arrangement in direction of an optical axis of lens system of the camera.

28. The camera of claim 16 wherein said device, which is mechanically connected to the one or more diaphragm shutter blades is a yoke.

29. The camera of claim 16 wherein said aperture is controlled continuously.

30. The camera of claim 16 wherein said camera shutter is used for a video camera.

* * * * *